Dec. 4, 1928.
T. L. WATTS
1,694,195
VARIABLE DIRECTION CONTROL FOR TRAILING OBJECTS
Filed Jan. 25, 1928.  2 Sheets-Sheet 1
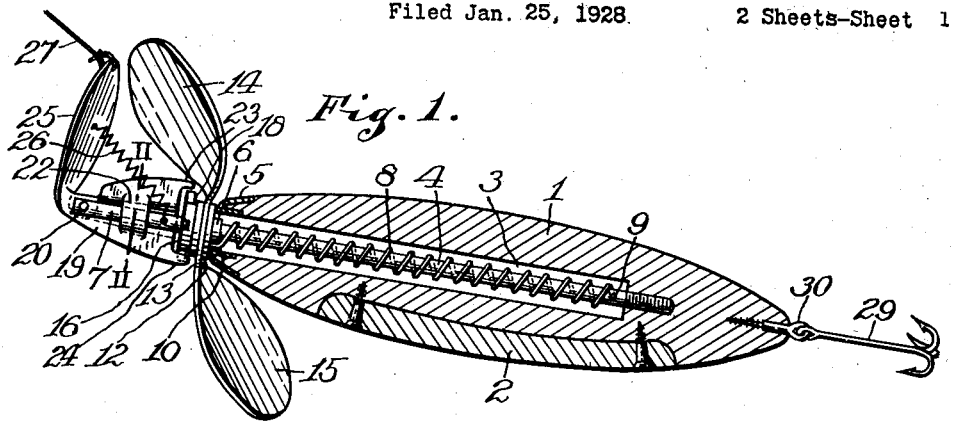
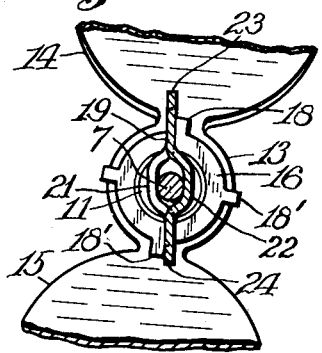
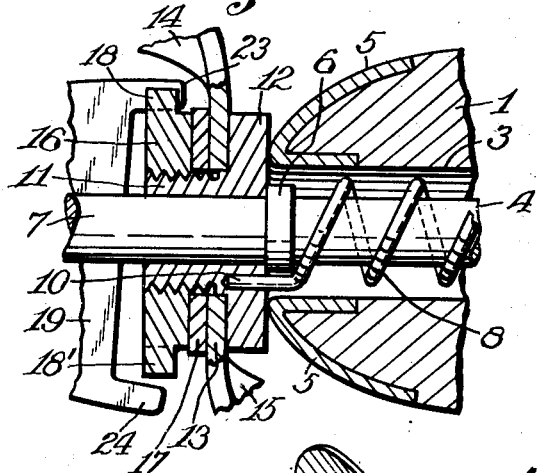
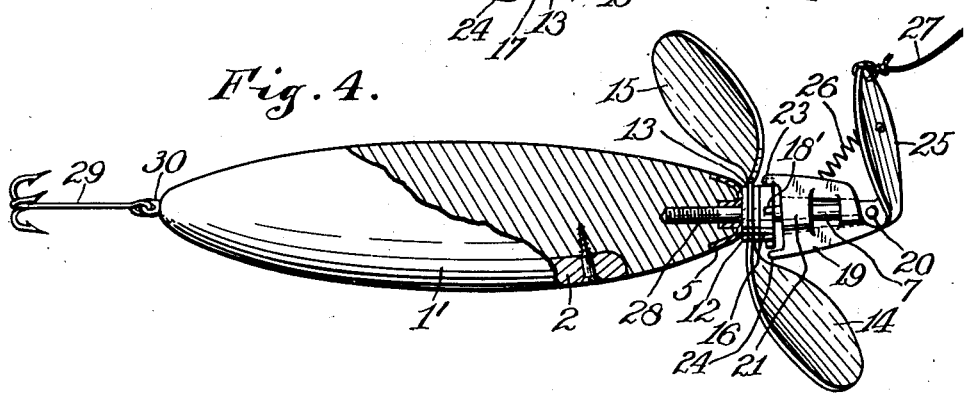
INVENTOR.
Thomas L. Watts,
BY E. T. Silvius,
ATTORNEY.

Dec. 4, 1928.
T. L. WATTS
1,694,195
VARIABLE DIRECTION CONTROL FOR TRAILING OBJECTS
Filed Jan. 25, 1928  2 Sheets-Sheet 2
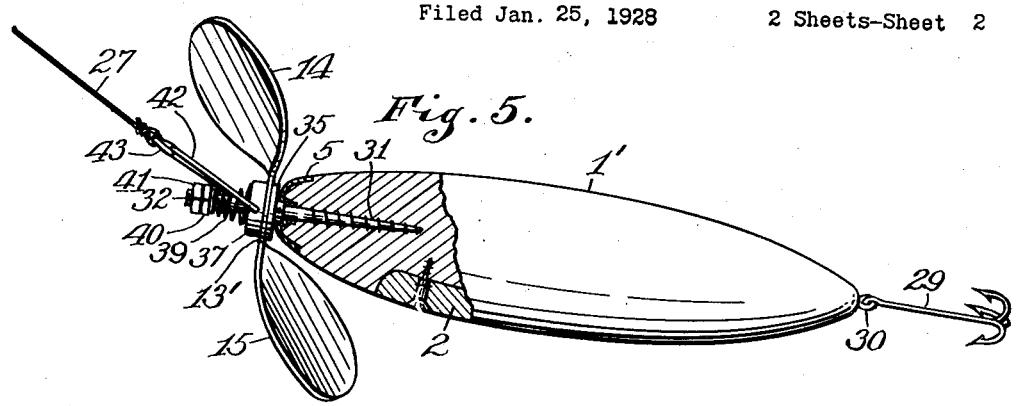
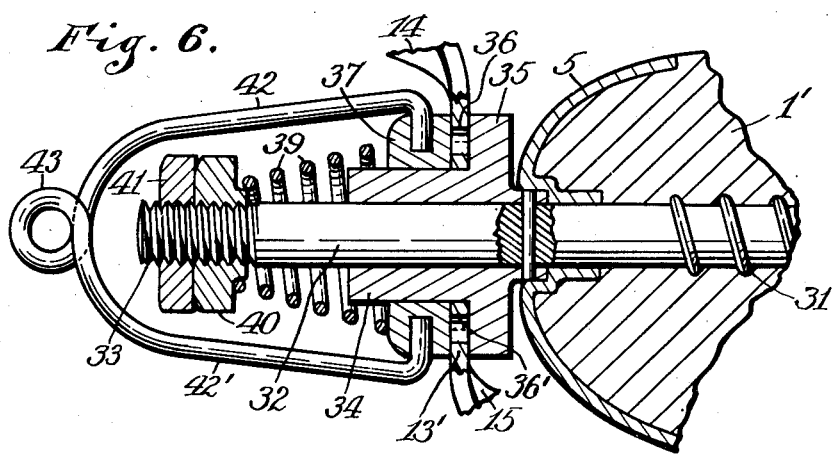
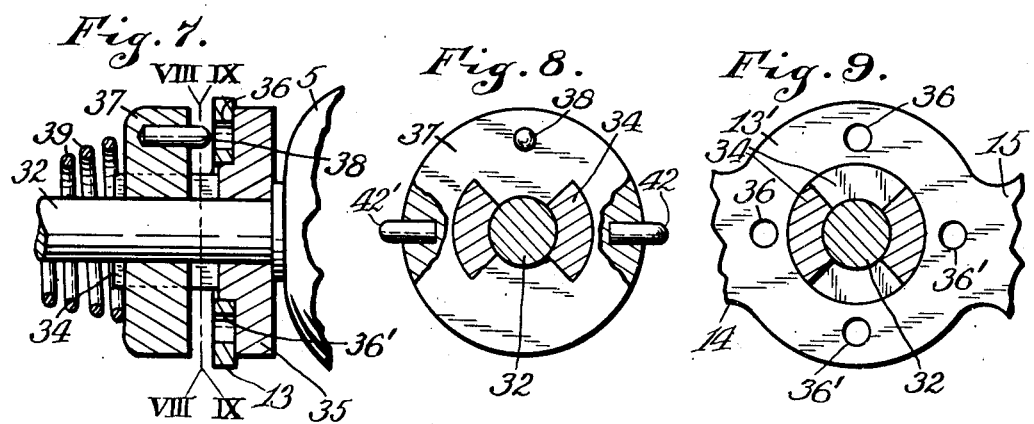
INVENTOR.
Thomas L. Watts,
BY
E. T. Silvius,
ATTORNEY.

Patented Dec. 4, 1928.

1,694,195

UNITED STATES PATENT OFFICE.

THOMAS L. WATTS, OF INDIANAPOLIS, INDIANA.

VARIABLE DIRECTION CONTROL FOR TRAILING OBJECTS.

Application filed January 25, 1928. Serial No. 249,443.

This invention relates to variable means for controlling direction of motion of trailing objects in water or in air and has reference also to an artificial minnow or casting bait and means whereby to cause the minnow to dart through water in different directions to attract the attention of fishes.

An object of the invention is to provide simple and efficient means whereby to variably control direction of movements of trailing objects which may be used to guide other objects in the air or in water, as may be required or desired.

Another object is to provide an improved variable direction control for trailing objects such as artificial minnows or casting baits, to provide for up and down and side to side darting movements to attract the attention of fishes.

A further object is to provide an improved artificial minnow or casting bait and controlling means therefor which shall be of simple and inexpensive construction and efficient in causing darting movements thereof in water, so as to be adapted not only to attract the attention of fishes but the attention of observers.

A still further object is to provide an interesting and instructive artificial minnow or casting bait at small cost and which shall be adapted for catching fishes and also instructive and amusing, and which shall be durable and economical in use.

With the above-mentioned and other objects in view, the invention consists in an article adapted to be pulled through water or through air and provided with controlling means for variably changing the direction of movement thereof at will, the invention consisting also further in the parts and combinations and arrangements of parts as hereinafter particularly described and further defined in the accompanying claims.

Referring to the accompanying drawings,—Figure 1 is a central longitudinal section of an artificial minnow or casting bait provided with the improved controlling means in one of the forms thereof; Fig. 2 is a fragmentary section on the line II—II in Fig. 1 on an enlarged scale; Fig. 3 is a fragmentary central longitudinal section showing the controlling means on a further enlarged scale; Fig. 4 is a side elevation, partly in section, showing the minnow or casting bait and its controlling means set in a different position from that seen in Fig. 1, the details being slightly modified; Fig. 5 is a side view of the minnow or casting bait showing a modified form of controlling means; Fig. 6 is a fragmentary central longitudinal section of a modified controlling means on an enlarged scale; Fig. 7 is a fragmentary sectional detail taken on a plane at right angles to the plane of the section on which the preceding figure is taken; Fig. 8 is a section on the line VIII—VIII on Fig. 7; and Fig. 9 is a section on the line IX—IX in Fig. 7.

Similar reference characters in the different figures of the drawings indicate corresponding elements or features of construction herein referred to in detail.

As embodied in an artificial minnow or casting bait, the invention comprises a main or body part 1 of suitable buoyant material and having tapered opposite ends, the normal under side thereof being provided with a suitable balance weight 2 suitably secured therein. Preferably the main part has a central longitudinal bore 3 that is open in the normal forward end of the main part. Preferably a rod 4 is centrally arranged in the bore and its inner end screwed or otherwise secured to the main part in the end of the bore. The forward end of the main part preferably has a protecting cap 5 thereon that has a portion extending into the bore. The rod has a thrust-bearing collar 6 fixed thereto that is located at the end of the main part, the rod 4 extending outward beyond the collar and being adapted to constitute a stub shaft 7. Preferably a helical spring 8 is arranged on the rod 4 within the bore 3 and has its rear end provided with a lug 9 extending into a hole in the rod adjacent to its inner end, the opposite end of the spring being provided with a projecting lug 10 whereby the spring may be wound about the rod. A hub 11 having external screw threads is rotatably supported on the shaft 7 adjacent to the collar 6 and has a flange 12 thereon, and the lug 10 is suitably connected to the hub. A blade hub 13 is arranged on the hub 11 against the flange 12 and has preferably two blades 14 and 15 integral therewith, one blade extending forwardly at an inclination and the other rearwardly at an inclination to the axis of the shaft 7, the blades preferably being slightly twisted, and are twisted if the spring 8 be omitted as is permissible. One or the other of the blades might be omitted if desired, although two blades are preferred. A nut 16 is arranged on the hub 11 to secure the hub 13 in place, and preferably a washer 17 is placed behind the nut. The nut has a suitable number of radial projections 18 and 18' thereon whereby to stop rotation of the hub. The projections should have proper positions relatively to the blades and therefore different thicknesses of washers may be used to bring the projections properly in place when the nut is tightened.

Various means may be provided for intermittently stopping and releasing the blades, preferably an oscillatory plate 19 being provided and connected adjacent to one end thereof by a pivot 20 to the shaft 7 adjacent to its end, the plate preferably being slitted and portions thereof pressed out to constitute side guides 21 and 22 on opposite sides of the shaft, the rearward end of the plane having two latch projections or fingers 23 and 24 thereon spaced apart to receive the nut and one of the projections 18 between them, the plate being provided with a relatively angular lever member 25 which preferably is slightly twisted oppositely to the twist of the blade 14, and a coil spring 26 is connected to the shaft 7 and to the lever member whereby to tilt the plate 19 in one direction so as to bring the finger 24 in position to engage the projection 18 or 18' that is undermost, the plate being intermittently tilted by means of a cord 27 connected to the end of the member 25 whereby the minnow or bait is pulled through the water.

When it is desired to omit the spring 8 and depend on the action of the water against the blades 14 and 15 to turn them so as to change the direction of movement of the device, the bore 3 and the long rod 4 are not needed, and the shaft 7 is provided with a shank 28 which is secured rigidly in the forward end of the main or body part 1'.

A hook 29 having a suitable number of prongs is connected to the rear end of the main or body part of the minnow, preferably by means of a screw eye 30.

In another modified form of structure the control of the blades is effected by devices slightly different in detail from those above described, the spring 8 being omitted; and instead, a screw 31 is secured in the forward portion of the body 1' and extends beyond to constitute a stud 32 having screw threads 33 adjacent to its end. The stud has a bearing member 34 secured thereto on which is a guide flange 35. The blades 14 and 15 have a hub portion 13' that is rotatably arranged on the bearing member against the flange 35, the hub portion having a suitable number of perforations 36 and 36' therein spaced equidistantly apart to receive a stop pin to correctly position the blades for changing the direction of motion of the device. A locking collar 37 is arranged to slide longitudinally on the member 34 to clamp the blade hub against the flange 35 and the collar has a stop pin 38 fixed thereto that is adapted to be pushed successively into the perforations in the hub 13', the collar being forced into contact with the hub 13' by means of a volute spring 39 seated thereon and extending about the stud 32 into contact with a nut 40 screwed onto the stud and preferably secured in place by a lock nut 41. A yoke is provided having two rods 42 and 42' that are connected to the collar 37 and a loop 43 formed integrally with the rods, the cord 27 being connected to the loop. The member 34 has grooves in its sides into which portions of the collar 37 extend to prevent rotation of the collar on the bearing member.

With the provisions for stopping the blades at four points in a revolution the minnow is caused to move upward and downward and also to the right and the left as it is drawn through the water, the control of the turning of the blades being effected by means of the line 27; but if it be desired that the direction of movement be only upward and downward or sidewise in opposite directions, two opposite projections 18' or two opposite perforations 36' are omitted, those remaining giving the desired results.

In practical use the minnow or object is pulled by means of the cord 27 by an operator who in some cases may be on an airplane, and the minnow might be connected to another object that may be required to be guided. The minnow may be pulled through the water and its direction of movement repeatedly changed if the line 27 be momentarily slackened to permit action of the spring 26 to cause tilting of the plate 19 which releases the blades and permits them to be turned by action of the water as the blades are forced through it, or to be turned by action of the spring 8 under tension. With the modified construction the line 27 is suddenly jerked to overcome the resistance of the spring 39, and to draw the collar 37 forward so as to release the pin 38 from connection with the hub of the blades so that they can turn on the member 34 until stopped by the pin and action of the spring. When the blades are set as in Figs. 1 and 5 the minnow is pulled upwardly, and when set as shown in Fig. 4 the minnow will be drawn downwardly, as will be obvious.

What is claimed as new is:

1. A direction control including a main part, a blade mounted to rotate on the front of the main part and facing forwardly at an inclination, and means associated with the main part to intermittently stop rotation of the blade.

2. A direction control including a main part to be trailed, a hub mounted to rotate on the front of the main part and having two blades fixed thereto and inclined to the axis of rotation, one of the blades extending forwardly and the other rearwardly, and means to intermittently stop rotation of the hub.

3. A direction control including a main part to be trailed, a hub mounted to rotate on the front of the main part and having a blade whose front face is inclined to the axis of rotation of the hub, the blades being twisted, a pulling cord and a spring, and means associated with the main part and controlled by the cord and the spring to intermittently stop rotation of the hub.

4. An artificial minnow comprising a body having a central bore, a shaft mounted in said bore projecting from one end of the body, a rotatable member mounted on the shaft at one end of the body, and means carried by said body for rotating said rotatable member.

5. An artificial minnow comprising a body having a central bore, a shaft mounted in said bore projecting from one end of the body, a rotatable member mounted on the shaft at one end of the body, means carried by said body for rotating said rotatable member, and means for causing intermittent stopping of said rotatable member.

6. An artificial minnow comprising a body having a central bore, a shaft mounted in said bore projecting from one end of the body, a rotatable member mounted on the shaft at one end of the body, means carried by said body for rotating said rotatable member, means for causing intermittent stopping of said rotatable member, and means for counteracting rotary motion of the minnow body caused by the rotation of the rotatable member.

7. A casting minnow comprising a body, a shaft mounted in said body, a rotatable member mounted on said shaft, means in said body for rotating said rotatable member, and means for intermittently interrupting such rotation, substantially as set forth.

8. A casting minnow comprising a body, a shaft mounted in said body, a rotatable member mounted on said shaft, means in said body for rotating said rotatable member, means for intermittently interrupting such rotation, and means for counteracting rotation of the body.

9. A casting minnow comprising a body, a shaft mounted in said body, a rotatable member mounted on said shaft, means in said body for rotating said rotatable member, and oscillatory means for intermittently interrupting the rotation of said rotatable member.

10. A casting minnow comprising a body, a shaft mounted in said body, a rotatable member mounted on said shaft, and oscillatory means for intermittently interrupting the rotation of said rotatable member, said oscillatory means having a member formed at its forward end for counteracting the rotation of the body due to the action of the rotatable member.

11. A casting minnow comprising a body, a shaft mounted in said body, a rotatable member mounted on said shaft, oscillatory means for intermittently interrupting the rotation of said rotatable member, said oscillatory means having a member formed at its forward end for counteracting the rotation of the body due to the action of the rotatable member, and a spring normally holding said oscillatory means in a predetermined position.

12. An artificial minnow comprising a body having a central bore, a shaft mounted in said bore projecting from one end of the body, a rotatable member mounted on the shaft at one end of the body, and a spring housed in the bore with one end fixed relative to the body and its other end connected to the rotatable member for rotating said rotatable member due to the twisting action of the spring.

13. A casting minnow comprising a body, a shaft carried by said body, a rotary member on said shaft, and means associated with said shaft and rotary member for causing intermittent rotation of the rotary member.

14. A casting minnow comprising a body, a shaft carried by said body, a rotary member on said shaft, controlling means associated with said shaft and rotary member for causing intermittent rotation of the rotary member, and a cord connected with the controlling means to draw the body and control said means.

In testimony whereof, I affix my signature on the 21st day of January, 1928.

THOMAS L. WATTS.